(12) United States Patent
Lindner

(10) Patent No.: US 7,252,598 B2
(45) Date of Patent: Aug. 7, 2007

(54) SHAFT COUPLER

(75) Inventor: Jeffrey L. Lindner, Madison, AL (US)

(73) Assignee: Balance-Certified Golf, Inc., Madison, AL (US)

( * ) Notice: Subject to any disclaimer, the term of this patent is extended or adjusted under 35 U.S.C. 154(b) by 0 days.

(21) Appl. No.: 11/251,996

(22) Filed: Oct. 17, 2005

(65) Prior Publication Data

US 2006/0084520 A1    Apr. 20, 2006

Related U.S. Application Data

(60) Provisional application No. 60/619,664, filed on Oct. 18, 2004.

(51) Int. Cl.
*A63B 53/10*    (2006.01)
*A63B 53/12*    (2006.01)

(52) U.S. Cl. ................ 473/320; 403/303; 403/360

(58) Field of Classification Search ........ 473/316–323, 473/309–310, 296–299, 239, 307; 403/365
See application file for complete search history.

(56) References Cited

U.S. PATENT DOCUMENTS

| | | | |
|---|---|---|---|
| 2,542,967 A * | 2/1951 | Waechter ................. 248/188.5 |
| 2,679,911 A * | 6/1954 | Bhend ........................ 52/298 |
| 5,253,867 A | 10/1993 | Gafner |
| 5,429,358 A | 7/1995 | Rigal et al. |
| 5,544,879 A | 8/1996 | Collins |
| 5,735,752 A * | 4/1998 | Antonious ................. 473/317 |
| 5,823,699 A * | 10/1998 | Austin et al. ............. 403/109.1 |
| 5,904,626 A | 5/1999 | Fendel et al. |
| 5,904,627 A | 5/1999 | Miyaji et al. |
| 6,182,539 B1 * | 2/2001 | Webster .................... 81/177.2 |
| 6,203,446 B1 | 3/2001 | Collins |
| 6,203,447 B1 | 3/2001 | Dillard |
| 6,447,404 B1 | 9/2002 | Wilbur |
| 6,582,320 B2 | 6/2003 | Fendel |
| 6,729,970 B2 | 5/2004 | Horwood et al. |
| 2002/0082111 A1 | 6/2002 | Hedrick et al. |
| 2002/0098907 A1 | 7/2002 | Hsu |
| 2002/0137574 A1 | 9/2002 | Wu |
| 2003/0050132 A1 | 3/2003 | Wilbur |
| 2003/0109327 A1 | 6/2003 | Ho |
| 2003/0176236 A1 | 9/2003 | Fendel |
| 2003/0181255 A1 | 9/2003 | Ho |
| 2004/0018887 A1 * | 1/2004 | Burrows .................... 473/307 |
| 2004/0043825 A1 | 3/2004 | Horwood et al. |
| 2004/0043826 A1 | 3/2004 | Horwood et al. |
| 2004/0072627 A1 | 4/2004 | Pompa |
| 2004/0106463 A1 | 6/2004 | Horwood et al. |
| 2005/0143186 A1 * | 6/2005 | Blattner et al. ............ 473/296 |

* cited by examiner

*Primary Examiner*—Stephen Blau
(74) *Attorney, Agent, or Firm*—Bradley, Arant, Rose & White

(57) ABSTRACT

A device for coupling two shaft members of differing diameters. The device includes a barrel and a reaction mass. The barrel is hollow and includes an outside coupler formed by the exterior surface of an upper portion of the barrel, an inside coupler formed by the inside surface of the barrel, and a reaction mass interface formed by the exterior surface of a lower portion of the barrel. The outside coupler is sized to fit inside a hollow end of the first shaft member. The inside coupler is sized to receive the second shaft member. The reaction mass slides over the second shaft member and into position on the reaction mass interface of the barrel. The parts are secured together with an adhesive.

16 Claims, 3 Drawing Sheets

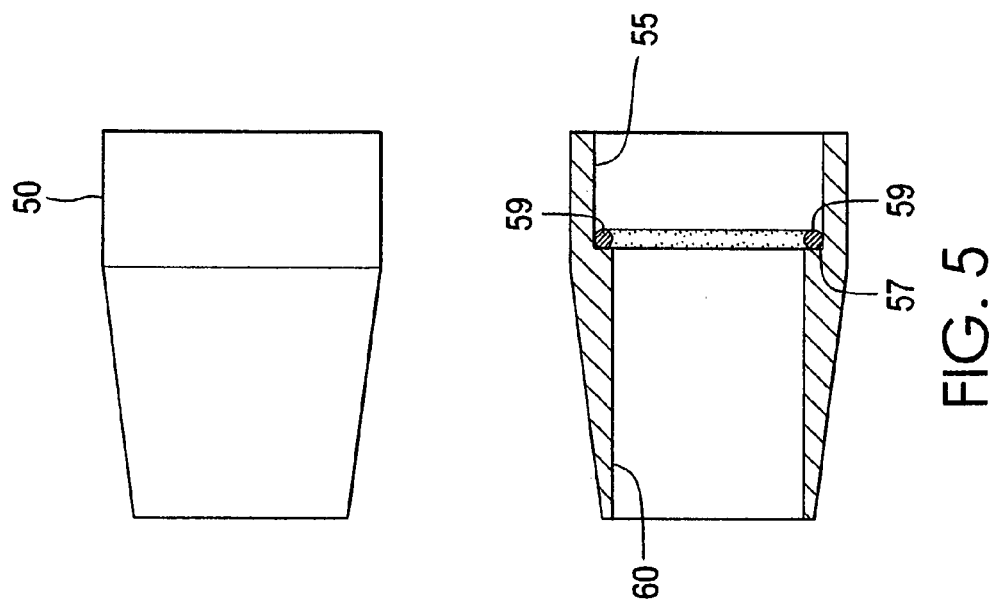
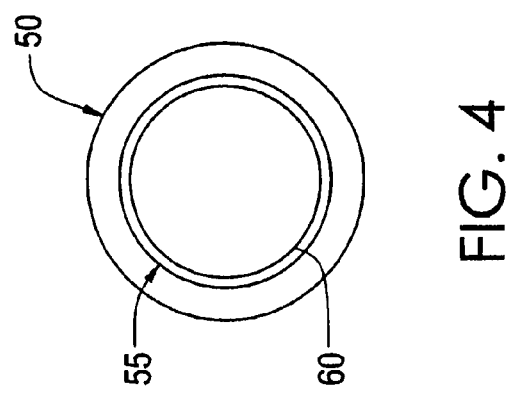

SHAFT COUPLER

This application claims the benefit of U.S. provisional patent application No. 60/619,664, filed Oct. 18, 2004.

BACKGROUND

The present invention provides an apparatus for coupling two sections of tubing, shafts, or bars of differing diameters. The tubing sections referred to in the remainder of this description are graphite or steel sections joined to form a golf club shaft. However, the choice of tubing sections used to form golf club shafts is exemplary only, and the apparatus of the present invention may be used to join tubing, shafts, or bars for any other device or purpose as appropriate, made of metallic, composite, plastics, natural materials, or any combination thereof. The term "shaft" is used generically to refer to any of the foregoing.

It may be desirable to join two shaft sections made of different materials, of different sizes, or otherwise having different properties, for a variety of reasons. In the case of golf clubs, graphite and steel shafts each have their particular advantages and disadvantages. By making a single shaft including shaft members of each material, the positive attributes of each material may be maximized while minimizing the relative disadvantages of each material. A discussion of the desirability of different properties of different shaft materials and the factors that go into designing and choosing shaft sections is beyond the scope of this patent. However, the shaft sections chosen must nevertheless be joined.

SUMMARY

One embodiment of the present invention comprises a reaction mass coupler for coupling a first shaft to a second shaft. Each said shaft has a coupling end to be coupled to the device. The coupling end of the first shaft is hollow with an inside diameter being greater than the outside diameter of the coupling end of the second shaft. The reaction mass interface includes a barrel and a reaction mass, each having a generally circular cross section. The barrel is hollow and includes an outside coupler formed by the exterior surface of an upper portion of the barrel, a reaction mass interface formed by the exterior surface of a lower portion of the barrel, and an inside coupler formed by the inside surface of the barrel. The inside coupler overlaps both the outside coupler and the reaction mass interface and is slightly larger in diameter than the outside diameter of the coupling end of the second shaft. This permits this end of the second shaft to be inserted into said inside coupler and adhered in position. The outside coupler is slightly smaller in diameter than the inside diameter of the coupling end of said first shaft such that the outside coupler may be inserted into the coupling end of the first shaft and adhered in position.

The reaction mass includes an upper portion and a lower portion. The inside diameter of the upper portion is slightly larger than the outside diameter of the reaction mass interface, with its length approximately corresponding to the length of the reaction mass interface. This permits the upper portion of said reaction mass to be slid over the reaction mass interface and adhered in position. The lower portion of the reaction mass has an inside diameter slightly larger than the outside diameter of the coupling end of the second shaft. In this way, the reaction mass fits closely onto both the reaction mass interface and the second shaft.

Another embodiment of the present invention is a golf club shaft made of a first shaft member coupled to a second shaft member with the reaction mass interface as described. Typically, the first shaft member is made of graphite and the second shaft member is made of steel.

DESCRIPTION OF DRAWINGS

These and other features, aspects, structures, advantages, and functions are shown or inherent in, and will become better understood with regard to, the following description and accompanied drawings where:

FIG. 4 is an end view of the reaction mass of the embodiment of FIG. 1; and FIG. 5 is a sectional view of the reaction mass of FIG. 4.

DETAILED DESCRIPTION

Figure 1:
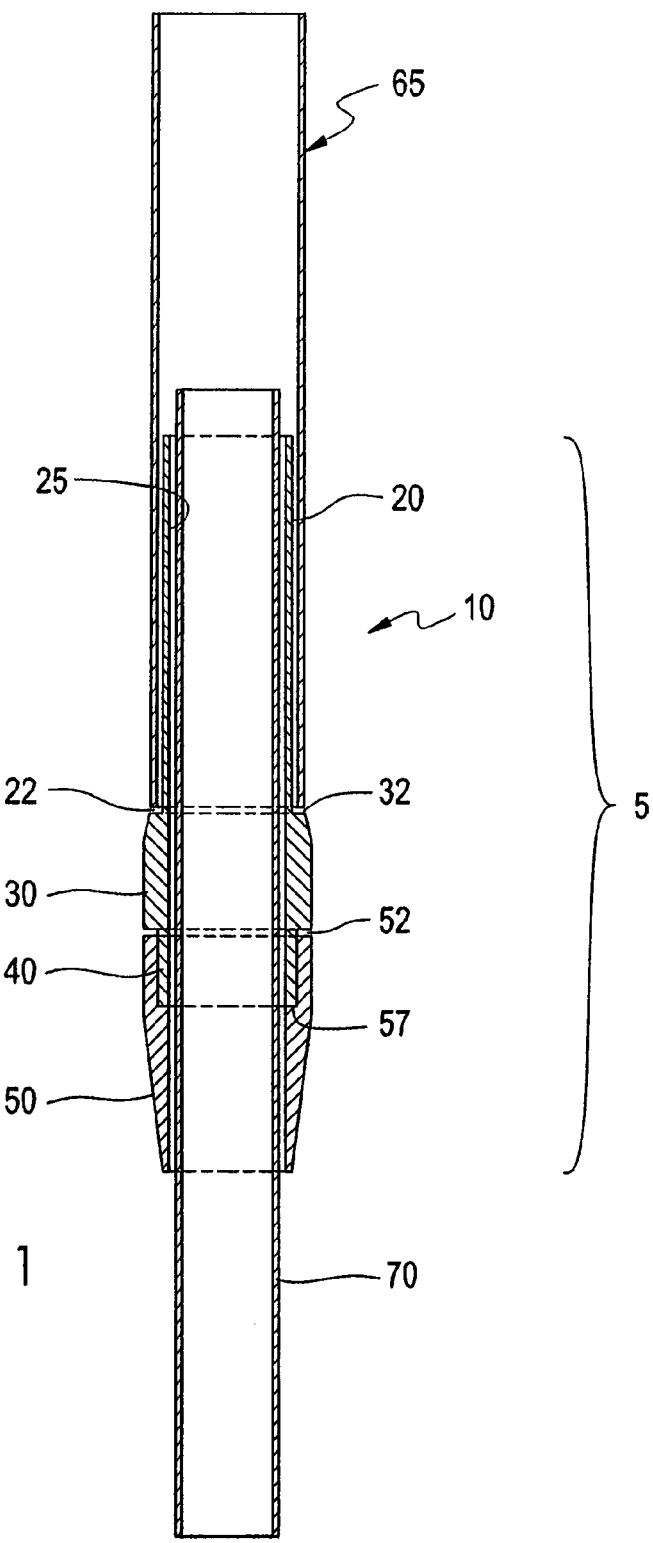
FIG. 1 is a top view of one embodiment of the present invention as assembled onto two shaft sections.

As shown in FIGS. 1-5, one embodiment of the reaction mass coupler 5 of the present invention comprises a barrel 10 and a reaction mass 50. FIG. 1 illustrates the reaction mass coupler 5 joining a first shaft member 65 with a second shaft member 70. In a representative golf club shaft assembly, the first shaft member 65 will be made of graphite and serve as the upper portion of the shaft, and the second shaft member 70 will be made of steel and serve as the lower portion of the shaft, with the club head attached at its lower end. The shaft members may be tapered or otherwise be of varying cross section along their length. As used herein, the end of each respective shaft member adjacent to one another in the assembly, i.e., joined to the reaction mass coupler, shall be called the coupling end of the shaft. It also should be noted that the phrase "coupling end" is not limited to the extreme tip or terminus of the shaft member, but encompasses that length of the shaft approximate its terminus used in the coupling joint as described herein. Further, although golf club shafts are typically hollow throughout their length, the present invention could be used to join two bars or other solid members so long as a bore could be made at the coupling end of the first shaft member to receive the outside coupler of the present invention. Finally, for two shaft members to be joined by the invention described herein, the inside diameter of the coupling end of the first (upper) shaft member 65 must necessarily be larger than the outside diameter of the second (lower) shaft member 70.

The barrel 10 is hollow and of generally cylindrical shape, though not necessarily of constant inside and outside diameters, which are set according to the dimensions of the shaft members to be joined. The barrel 10 has an outside coupler 20 formed by an upper portion of its exterior surface, an inside coupler 25 formed by the inside surface of the barrel, and a reaction mass interface 40 formed by a lower portion of the exterior surface of the barrel. In a preferred embodiment, the outside coupler 20 and the reaction mass interface 40 are separated by a collar 30.

The inside coupler 25 is of a diameter sufficient to permit the insertion of the coupling end of the second shaft member 70 into and if desired through the barrel 10. The diameter of the inside coupler 25 therefore may be uniform, or it may have a slight taper depending on the taper of the shaft to be inserted into it. Also note that a slight gap of approximately 0.005 to 0.030 inches in an exemplary embodiment between the inside coupler 25 and the outside wall of the second shaft member 70 is desirable in order to provide a space for adhesive between the surfaces. Further, adhesive can be used to fill the non-uniform gap created by a tapering second shaft member 70 being inserted into an inside coupler 25 of uniform diameter.

The second shaft member 70 may be inserted into the inside coupler as far as desired or required in a particular application, depending on the properties of the shaft member 70 and desired characteristics of the final shaft assembly. In a preferred embodiment, and as shown in FIG. 1, the coupling end of second shaft member 70 is inserted into the inside coupler 25 and all the way through the barrel 10 until the coupling end protrudes about one-quarter inch from the upper end of the barrel 10.

The outside coupler 20 is sized to be inserted within the first shaft member 65 leaving only a small gap (for example, about 0.005 to 0.030 inches) for an adhesive between the outer surface of outside coupler 20 and the inner surface of the shaft member 65. The first shaft member 65 thus positioned on the outside coupler 20 may overlap the second shaft member 70 joined to inside coupler 10, and, in a preferred embodiment as shown in FIG. 1, the first shaft member 65 and second shaft member 70 substantially overlap.

The collar 30 may a larger diameter than the outside coupler 20. In an exemplary embodiment, the diameter of the collar 30 will be chosen to be approximately the same as the outside diameter of the first shaft member 65, in order to give a smooth or flush external appearance and feel to the joint. An upper shoulder 32 is formed at the junction of the outside coupler 20 and the collar 30, and thus the first shaft member 65 can be slid over the outside coupler until the former abuts the shoulder 32. However, it has been determined that it is desirable to leave a small gap 22 (approximately 0.030 inches) between the tip of the shaft member 65 and the shoulder 32 when the parts are assembled and adhered together and then to fill the small gap with a resin or epoxy.

Figure 3:
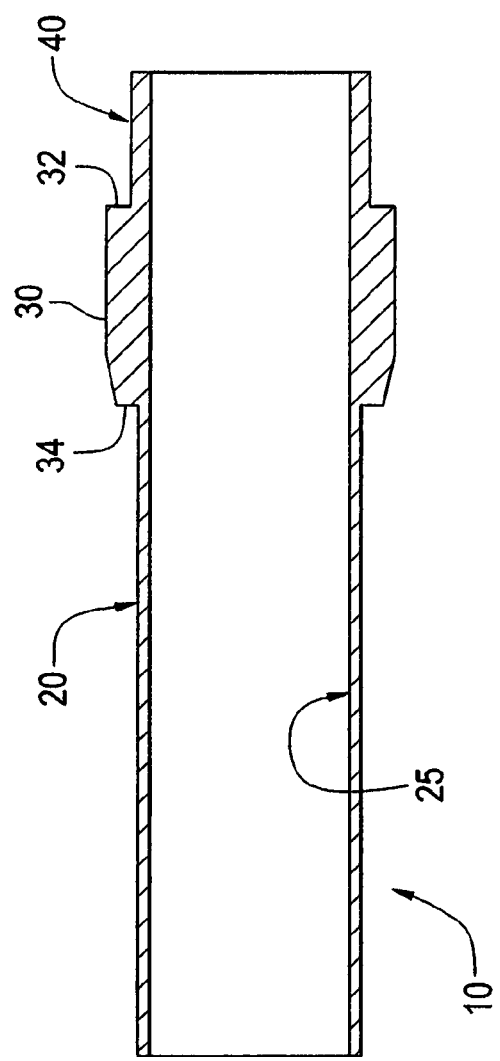
FIG. 3 is a sectional view of the barrel of FIG. 2.
Figure 2:
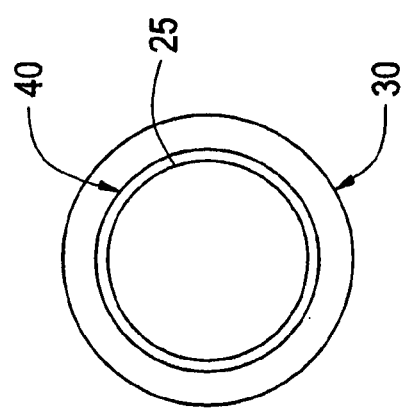
FIG. 2 is an end view of the barrel of the embodiment of FIG. 1.

The reaction mass interface 40 is sized to permit the reaction mass 50 to be slid onto its exterior. Thus, the external dimensions of the reaction mass interface 40 are relative to the dimensions of the reaction mass 50. Usually, the outside diameter of the reaction mass interface 40 will be smaller than that of the collar 30 (as shown in FIG. 3), thus forming a shoulder 34 at the junction of these two sections.

The reaction mass 50 is hollow and of generally circular cross section, although it may have sections of differing internal and external diameters as described herein. The reaction mass has an upper portion 55 and a lower portion 60. The upper portion 55 is sized to be slid onto the reaction mass interface 40. Thus, the internal diameter of the upper portion 55 of the reaction mass is slightly larger than the outside diameter of the reaction mass interface 40. The length of the upper portion 55 likewise corresponds to the length of the reaction mass interface 40.

The internal diameter of the reaction mass 50 steps down at the transition to the lower portion 60. The internal diameter of the lower portion 60 is slightly larger than the outside diameter of the second shaft member 70 at its junction with the reaction mass interface 40. Thus, the reaction mass may be slid over the second shaft member 70 and into position onto the barrel 10, with the upper portion 55 of the reaction mass 50 overlapping the reaction mass interface 40 (with a slight gap therebetween to accommodate an adhesive) and with the lower portion 60 of the reaction mass 50 overlapping the section shaft member 70. When assembled, the shoulder 57 formed at the junction of the upper and lower portions of the reaction mass 50 thus is located approximately at the terminus of the reaction mass interface 40, and the upper end of the reaction mass 50 is located at approximately the shoulder 34 at the junction of the reaction mass interface 40 and the collar 30 of the barrel. Thus, the reaction mass can be pushed into place until these surfaces abut one another. However, it has been determined that it is desirable to leave a small gap 52 (approximately 0.030 inches) between the upper terminus of the reaction mass 50 and the shoulder 34 of the collar 30 when the parts are assembled and adhered together and then to fill the small gap with a resin or epoxy. In a preferred embodiment, an o-ring 59 may be placed around the shaft member 70 proximate the shoulder 57 to act as a spacer between the parts.

The outside diameter of the reaction mass, at least at its upper end, will typically be chosen to be the similar to that of the collar (which in turn will typically be chosen to be the similar to that of the outside diameter of the first shaft member 65) in order to give a smooth flush feel and appearance to the joint. These dimensions do not have to be exactly the same for the transition between each part in the joint to appear and feel smooth. The outside diameter of the reaction mass is then typically tapered (as shown in FIG. 5) towards its lower end to provide a smooth transition to the smaller diameter of the second shaft member 70. The relative outside diameters of different portions the exterior of the reaction mass 50 do not necessarily correspond to the internal upper portion 55 and lower portion 60.

The shafts 65 and 70, barrel 10 and reaction mass 50, when assembled as described herein, are held together by an adhesive layer in the small gap described between each adjacent overlapping surface. These bonding surfaces can be knurled or roughened to facilitate adhesion. The dimensions of the gap between bonding surfaces described herein (0.005 to 0.030 inches) are exemplary only, and can be adjusted as needed or desired for a particular application. Thin strips of tape or other similar spacers can be used to maintain a consistent gap width or spacing between the parts.

The shaft members, the barrel and the reaction mass are described herein as being of generally circular cross section. It should be understood that the invention can be adapted to join shaft sections having an elliptical or asymmetric cross section, and thus the phrase "generally circular" encompasses such variations.

The barrel 10 and reaction mass 50 can be made of various materials as may be desirable or suitable for a given application, including any metal such as brass, steel, titanium, aluminum, or alloys thereof, or composite materials (carbon fiber or plastics), or ceramics. In a preferred embodiment, aluminum is chosen for its low cost, availability, ease of machining, and good strength-to-weight ratio.

In an exemplary embodiment of the present invention, the dimensions of the barrel and reaction mass are as follows, in inches:

|  | Diameter | Length |
| --- | --- | --- |
| Outside Coupler 20 | 0.507 | 1.4 |
| Inside Coupler 25 | 0.446 | 2.2 |
| Collar 30 | 0.620 | 0.5 |
| Reaction Mass Interface 40 | 0.524 | 0.3 |
| Upper Portion 55 | 0.540 (ID) 0.620 (OD) | 0.3 |

-continued

|  | Diameter | Length |
|---|---|---|
| Lower Portion 60 | 0.446 (ID) | 0.555 |
|  | 0.620 tapering to 0.486 |  |

The foregoing dimensions should in all respects be considered illustrative and exemplary only, and not limiting. For example, each dimension is subject to change depending on the dimensions of the shaft members chosen to be coupled.

The weight of the reaction mass 50 and characteristics of the adhesive layer between each part affects the vibration-transmitting characteristics of the reaction mass coupler and thus of any shaft joined with the coupler. The weight of the reaction mass 50 and characteristics of the adhesive layer can be adjusted iteratively to achieve a desired vibration characteristic.

Although the present invention has been described and shown in considerable detail with reference to certain preferred embodiments thereof, other embodiments are possible. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

I claim:

1. A device for coupling a first shaft to a second shaft, each said shaft having a coupling end to be coupled to said device, the coupling end of the first shaft being hollow with an inside diameter being greater than the outside diameter of the coupling end of the second shaft, said device comprising:

a barrel and a reaction mass, each of generally circular cross section, said barrel being hollow and comprising an outside coupler formed by the exterior surface of an upper portion of said barrel, a reaction mass interface formed by the exterior surface of a lower portion of said barrel, a collar between said outside coupler and said reaction mass interface, and an inside coupler formed by the inside surface of said barrel, said inside coupler overlapping both said outside coupler and said reaction mass interface;

said inside coupler being slightly larger in diameter than the outside diameter of the coupling end of said second shaft, such that said end of said second shaft is able to be inserted into said inside coupler and adhered thereto;

said outside coupler being slightly smaller in diameter than the inside diameter of said coupling end of said first shaft such that said outside coupler is able to be inserted into said coupling end and adhered thereto;

the diameter of said collar being larger than the diameters of said outside coupler and said reaction mass interface;

said reaction mass comprising an upper portion and a lower portion, said upper portion having an inside diameter slightly larger than the outside diameter of said reaction mass interface, the length of said upper portion approximately corresponding to the length of said reaction mass interface, such that said upper portion of said reaction mass is able to be slid over said reaction mass interface and adhered thereto;

said lower portion having an inside diameter slightly larger than the outside diameter of said coupling end of said second shaft.

2. The device of claim 1, wherein the diameter of said collar is the approximately the same as the outside diameter of said first shaft.

3. The device of claim 2, wherein the outside diameter of that portion of said reaction mass overlapping said reaction mass interface is approximately the same as the diameter of said collar.

4. The device of claim 3, wherein the outside diameter of that portion of said reaction mass not overlapping said reaction mass interface tapers from a diameter approximately the same as that of said collar to a diameter slightly larger than the outside diameter of said second shaft.

5. The device of claim 1, further comprising an o-ring, wherein said upper portion and said lower portion of said reaction mass are adjacent to one another such that a shoulder is formed at the junction thereof, and said o-ring is positioned around said second shaft and adjacent to said shoulder when said reaction mass is assembled onto said second shaft.

6. A golf club shaft comprising:

a first shaft member and a second shaft member, each said shaft member having a coupling end, the coupling end of the first shaft being hollow with an inside diameter being greater than the outside diameter of the coupling end of the second shaft;

a barrel and a reaction mass, each of generally circular cross section, said barrel being hollow and comprising an outside coupler formed by the exterior surface of an upper portion of said barrel, a reaction mass interface formed by the exterior surface of a lower portion of said barrel, and an inside coupler formed by the inside surface of said barrel, said inside coupler overlapping both said outside coupler and said reaction mass interface;

said inside coupler being slightly larger in diameter than the outside diameter of the coupling end of said second shaft, said end of said second shaft inserted into said inside coupler and adhered thereto in a position overlapping said outside coupler;

said outside coupler being slightly smaller in diameter than the inside diameter of said coupling end of said first shaft, said outside coupler inserted into said coupling end and adhered thereto;

said reaction mass comprising an upper portion and a lower portion, said upper portion having an inside diameter slightly larger than the outside diameter of said reaction mass interface, the length of said upper portion approximately corresponding to the length of said reaction mass interface, said upper portion of said reaction mass slid over said reaction mass interface and adhered thereto;

said lower portion having an inside diameter slightly larger than the outside diameter of said coupling end of said second shaft.

7. The device of claim 6, wherein said barrel further comprises a collar between said outside coupler and said reaction mass, the diameter of said collar being larger than the diameters of said outside coupler and said reaction mass interface, whereby an upper shoulder is formed at the junction of said outside coupler and said collar and a lower shoulder is formed at the junction of said reaction mass interface and said collar.

8. The device of claim 7, wherein the tip of said coupling end of said first shaft abuts said upper shoulder.

9. The device of claim 7, wherein the upper end of said reaction mass abuts said lower shoulder.

10. The device of claim 7, wherein said first shaft is adhered to said outside coupler in a position leaving a small gap between the tip of said coupling end of said first shaft and said upper shoulder, said small gap being filled with a resinous material.

11. The device of claim 7, wherein said reaction mass is adhered to said reaction mass interface in a position leaving a small gap between the upper end of said reaction mass and said lower shoulder, said small gap being filled with a resinous material.

12. The device of claim 7, wherein the diameter of said collar is approximately the same as the outside diameter of said first shaft.

13. The device of claim 12, wherein the outside diameter of that portion of said reaction mass overlapping said reaction mass interface is approximately the same as the diameter of said collar.

14. The device of claim 13, wherein the outside diameter of that portion of said reaction mass not overlapping said reaction mass interface tapers from a diameter approximately the same as that of said collar to a diameter slightly larger than the outside diameter of said second shaft.

15. The device of claim 6, further comprising an o-ring, wherein said o-ring is positioned around said second shaft and adjacent to the shoulder formed by the junction of said upper and lower sections of said reaction mass when said reaction mass is assembled onto said second shaft.

16. The device of claim 6, wherein said first shaft is made of graphite, and said second shaft is made of steel.

\* \* \* \* \*